M. E. SIPE.
PISTON RING.
APPLICATION FILED JUNE 9, 1920.

1,427,975. Patented Sept. 5, 1922.

INVENTOR
Martin E. Sipe
BY HIS ATTORNEYS
Williamson Ulrich

Patented Sept. 5, 1922.

1,427,975

UNITED STATES PATENT OFFICE.

MARTIN E. SIPE, OF MINNEAPOLIS, MINNESOTA, ASSIGNOR TO SEAL-TITE PISTON RING CO., OF MINNEAPOLIS, MINNESOTA, A CORPORATION OF MINNESOTA.

PISTON RING.

Application filed June 9, 1920. Serial No. 387,555.

*To all whom it may concern:*

Be it known that I, MARTIN E. SIPE, a citizen of the United States, residing at Minneapolis, in the county of Hennepin and State of Minnesota, have invented certain new and useful Improvements in Piston Rings; and I do hereby declare the following to be a full, clear, and exact description of the invention, such as will enable others skilled in the art to which it appertains to make and use the same.

My present invention provides an improved piston ring that is not only strong, durable and efficient as a non-leak ring in actual operation, but which is capable of being made at a small cost. Generally stated, the invention consists of the novel construction and combinations of parts hereinafter described and defined in the claims.

Particularly, the invention relates to that type of piston rings wherein a non-leak joint is produced, at the ends of the ring, by interlapping flanges or webs cut or formed integral with the ring. The present invention brings this type of piston ring to its highest point of perfection, by providing an arrangement of flanges and webs that interlap in such manner as to form the most efficient kind of a non-leak joint, and in which the interlapping flanges and webs, which are necessarily reduced in cross section as compared with the body of the ring, are nevertheless, given the greatest possible strength.

In the accompanying drawings which illustrate this improved ring, like characters indicate like parts throughout the several views.

Referring to the drawings.

Figure 1:
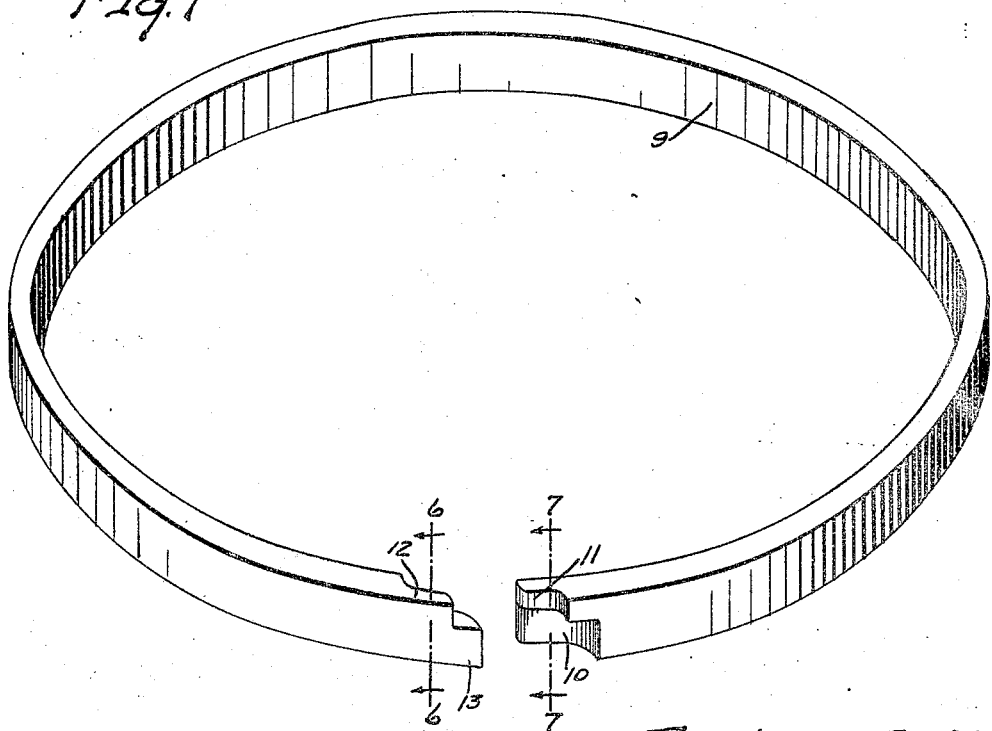
Fig. 1 is a perspective view showing the piston ring designed in accordance with my invention.
Figure 2:
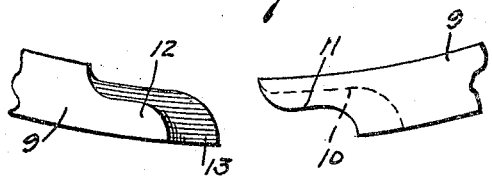
Fig. 2 is a side elevation showing the end portions of the ring.

The body of the ring, which may be of cast iron or other suitable metal, is indicated by the numeral 9, and this ring is transversely split at one point and formed with interlapping ends preferably made as follows:

The right-hand end of the ring, as shown in Fig. 1, is milled out and reduced in radial thickness to form a web 10 and a flange 11. The web 10 and flange 11 terminate on the same transverse line at the end of the ring, but the web 10 extends considerably further circumferentially backward on the outer portion of the ring than does the milled portion of the flange 11. In a transverse direction, the web 10 is much wider than the flange 11 but the flange 11, in a direction radially of the ring, is much deeper than the said web 10. Both the web 10 and the flange 11 are formed with rounded shoulders and rounded ends, and said rounded shoulders form fillets which very greatly strengthen the said flange and web. Usually, in making rings of this general type, the webs or flanges are cut completely across with square corners, and it is a well known fact that these reduced end portions are thus made very weak and liable to be broken off at their corner angles. Moreover, in practice, it is practically impossible to mill out square corners where the cut is not made completely across the face of the ring. The described arrangement of the flange and web, however, makes it possible to use an ordinary end milling cutter rotated on an axis parallel to the axis of the ring, so that the tool may be passed along the lines indicated and completely through the ring, thereby severing the ring and forming the ends thereof.

For co-operation with the end formed, as just stated, the left-hand end of the ring, as shown in Fig. 1, is reversely milled, that is, is milled out on its inner surface to form an end web 12 and a flange 13. The web 12 and the flange 13 terminate on the same line, at their inner extremities, but at the end of the ring, the flange 13 projects considerably further than the said web. The projection of the flange 13 beyond the web 12 should correspond to the extension of the web 10 beyond the base of the mill portion of the flange 11. Moreover, the width of the web 12 should correspond to the width of the flange 11 and the width of the flange 13 should correspond to the width of the web 10. From this it follows that the flange 13, in a transverse direction, is much wider and in a radial direction is much deeper than the web 12. This flange 13 is the only part of the ring that, in itself, projects beyond any other end portion of the ring, and hence, it is obviously important that it be given the greatest possible amount of metal in cross section. It will be noted that in the right hand end of the ring, as shown in Fig. 1, the web 10 and flange 11 mutually reinforce each other and that neither projects beyond the other, at least to any appreciable extent.

Figure 3:
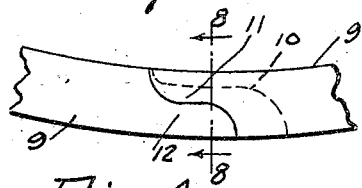
Fig. 3 is a view corresponding to Fig. 2, but showing the joint of the ring closed by interlapping of the reduced end flanges and webs thereof.
Figure 4:
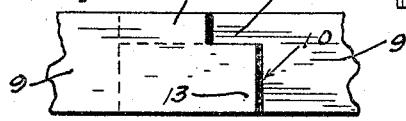
Fig. 4 is a plan view looking at the exterior of the end portions of the ring shown in Fig. 3.

The web 12 and flange 13, like the web 10 and flange 11, may be cut by an ordinary end milling cutter used as above indicated. The passage of the milling tool through the ring to form the ends, as stated, will leave the ring with a gap substantially as shown in Fig. 1, and usually, this will be just about the condition of the ring required to give the desired tension when the ring is contracted so that its end portions interlap substantially as shown in Figs. 3 and 4. Obviously, when the ends of the ring are interlapped, as shown in these two views, a non-leak joint is produced, that is the end joint of the ring will be closed against the passage of gas, steam, air, oil or other fluid therethrough, either in a transverse direction or in a radial direction.

Figure 6:
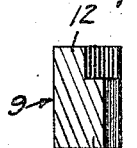
Fig. 6 is a section on the line 6—6 of Fig. 1.
Figure 7:
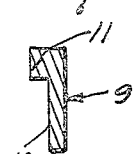
Fig. 7 is a section on the line 7—7 of Fig. 1.
Figure 5:
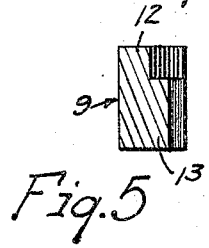
Fig. 5 is a fragmentary perspective showing one of the ends of the ring.
Figure 8:
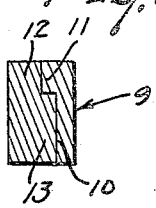
Fig. 8 is a section on the line 8—8 of Fig. 3.

By referring to Figs. 6, 7 and 8, it will be noted that both milled ends of the ring are approximately L-shaped in cross section, that is, have somewhat the form of an angle iron, so that the thin portion thereof is reinforced by a flange. This feature is also highly important. It will also be noted that the milled face of one of the ends faces radially outward, while the milled portion of the other end faces radially inward, and that the two milled portions are reverse, the one to the other, so that the one will closely fit the other.

This ring, is therefore, not only capable of being easily and cheaply made in a factory, but is highly efficient, strong and durable in operation.

What I claim is:

1. A piston ring provided at one end with a radially outwardly facing reduced portion forming a web and a web reinforcing flange laterally adjacent thereto, the said web and flange terminating on the same transverse line at the end of the ring, said web, in respect to said flange being relatively long, wide and shallow, and the said ring, at its other end having an inwardly facing reduced portion forming a web and a laterally adjacent reinforcing flange, said latter web and flange terminating on the same line at their inner extremities, said latter flange being, in respect to said adjacent web, relatively wide, radially deep and circumferentially long, so that it projects at that end of the ring beyond said adjacent flange, said flange on the latter noted end of said ring fitting the web on the first noted end of the ring, and the flange on the first noted end of the ring fitting the web on the second noted end of said ring.

2. A split piston ring having one of its ends formed with a portion of reduced radial thickness and extending across the greater part of the width of the ring, a reinforcing flange at the side of said portion extending for the remaining distance across the ring, said reduced portion and said flange having a curved portion connecting them to the inner and outer surfaces of the ring, said portion and flange terminating in the same line at the inner surface of the ring and at different lines at the outer surface of the ring, the other end of the ring being suitably formed to co-operate with the first mentioned end.

3. A piston ring for internal combustion engines having each end divided transversely into sections of different length, said sections also being of different radial thickness and terminating at one end in curved surfaces having a common terminal line.

In testimony whereof I affix my signature.

MARTIN E. SIPE.